(12) United States Patent
Endou

(10) Patent No.: US 10,050,929 B2
(45) Date of Patent: Aug. 14, 2018

(54) CONNECTION SETTING INFORMATION MANAGING SYSTEM

(75) Inventor: Masahito Endou, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 174 days.

(21) Appl. No.: 14/008,316

(22) PCT Filed: Mar. 9, 2012

(86) PCT No.: PCT/JP2012/056064
§ 371 (c)(1),
(2), (4) Date: Sep. 27, 2013

(87) PCT Pub. No.: WO2012/132833
PCT Pub. Date: Oct. 4, 2012

(65) Prior Publication Data
US 2014/0019599 A1  Jan. 16, 2014

(30) Foreign Application Priority Data

Mar. 29, 2011 (JP) .................................. 2011-071917

(51) Int. Cl.
*H04L 29/12* (2006.01)
*H04L 12/46* (2006.01)
(Continued)

(52) U.S. Cl.
CPC ...... *H04L 61/2007* (2013.01); *H04L 12/4641* (2013.01); *H04L 12/6418* (2013.01); *H04L 41/0806* (2013.01); *H04L 61/103* (2013.01)

(58) Field of Classification Search
CPC .............. H04L 61/2007; H04L 61/103; H04L 12/6418; H04L 41/0806; H04L 12/4641
See application file for complete search history.

(56) References Cited

U.S. PATENT DOCUMENTS 6,782,474 B1  8/2004 Ylonen
2001/0039590 A1*  11/2001 Furukawa ......... H04L 29/12009
709/238
(Continued)

FOREIGN PATENT DOCUMENTS

EP  1 307 027 A1  5/2003
JP  2003244185 A  8/2003
(Continued)

OTHER PUBLICATIONS

Search Report dated Jul. 28, 2014 issued by the European Patent Office in counterpart European Patent Application No. 12763632.2.
(Continued)

*Primary Examiner* — Chris Parry
*Assistant Examiner* — Soe M Hlaing
(74) *Attorney, Agent, or Firm* — Sughrue Mion, PLLC

(57) ABSTRACT

In a connection setting information managing system which is configured to set connection setting information using a setting tool, wherein the connection setting information allows a network device connected to an IP network to perform a communication over the IP network, the system includes: a connection setting information storage unit configured to store the connection setting information therein, wherein the connection setting information comprises a tag name that is assigned to and is unique to the network device. The setting tool sets the connection setting information to the network device, based on the tag name that is unique to the network device.

7 Claims, 7 Drawing Sheets

(51) Int. Cl.
*H04L 12/24* (2006.01)
*H04L 12/64* (2006.01)

(56) References Cited

U.S. PATENT DOCUMENTS

| | | | | |
|---|---|---|---|---|
| 2003/0084173 | A1* | 5/2003 | Deleu | H04L 29/12009 709/229 |
| 2004/0019668 | A1* | 1/2004 | Kakadia | H04L 41/046 |
| 2004/0250072 | A1* | 12/2004 | Ylonen | H04L 63/0428 |
| 2006/0029047 | A1* | 2/2006 | Ogata | H04L 29/12028 370/352 |
| 2007/0268515 | A1* | 11/2007 | Freund | H04L 67/34 358/1.15 |
| 2009/0150524 | A1 | 6/2009 | Arai et al. | |

FOREIGN PATENT DOCUMENTS

| | | |
|---|---|---|
| JP | 2007116424 A | 5/2007 |
| JP | 2009147420 A | 7/2009 |
| WO | 2004/064323 A1 | 7/2004 |

OTHER PUBLICATIONS

International Search Report dated Apr. 10, 2012 from the International Searching Authority in counterpart application No. PCT/JP2012/056054.

Written Opinion dated Apr. 10, 2012 from the International Searching Authority in counterpart application No. PCT/JP2012/056054.

* cited by examiner

CONNECTION SETTING INFORMATION MANAGING SYSTEM

TECHNICAL FIELD

The present invention relates to a connection setting information managing system and, more specifically, to management of connection setting information which allows a network device connected to an IP network to perform a communication over the IP network.

BACKGROUND ART

Usually, the IP address of a network device to be connected to an IP network is set at a certain value such as "192.168.0.1" in advance at the time of shipment from a factory. To use such a network device, first a user changes its IP address to a value that is suitable for a network environment of the user and then starts using it.

In ordinary network environments, device connection setting information that is necessary for a communication over an IP network is managed in the above-described manner. However, in industrial networks of factories etc., in many cases, a network device is installed before setting of its connection setting information.

In such a case, it is necessary to go to an installation site of a network device and carry out work of setting prescribed connection setting information. If network device are installed in a wide area, setting work requires much labor.

Even if network devices are located at distant places, prescribed settings can be made over an IP network as long as the respective network devices have different IP addresses. However, it is highly likelihood that the same IP address is set for network devices at the time of shipment from the factory. In this case, it is necessary to go to installation sites of the network devices and make necessary settings.

For example, where an IP network includes a wireless network which is constructed according to the wireless communications standard ISA 100.11a, a system manager, a gateway, and a backbone router (BBR) are connected to the IP network. One or more network devices exist on the IP network, and plural identical network device may be connected to the IP network.

FIG. 5 is a block diagram showing an example network which is part of a conventional connection setting information managing system. As shown in FIG. 5, a system manager 2, a gateway 3, and three backbone routers 4-6 are connected to an IP network 1 as network devices. A setting tool 7 for setting, for each of the network devices 2-6, connection setting information which allows it to perform a communication over the IP network is also connected to the IP network 1. Although field devices such as a flowmeter, a pressure meter, and temperature meter are also connected to the backbone routers 4-6, they are not shown in the figure.

As shown in FIG. 5, the IP addresses of these network devices are set at initial addresses in advance: "192.168.10.1" is set for the system manager 2, "192.168.10.2" is set for the gateway 3, and a common value "192.168.100.1" is set for the backbone routers 4-6.

With the above configuration, the setting tool 7 sets connection setting information for each of the network devices 2-6 according to the following procedure. It is assumed that the IP network 1 to which the network devices 2-6 are connected has been constructed in advance and each of the system manager 2, the gateway 3, and the three backbone routers 4-6 is connected to the IP network 1 in a state that it is only powered on (i.e., in a state at the time of shipment from a factory).

FIG. 6 illustrates how connection setting information is set for each of the system manager 2 and the gateway 3. To set connection setting information for each of the system manager 2 and the gateway 3, the IP address of the setting tool 7 is changed so that the setting tool 7 belongs to the same subnet as the two network devices 2 and 3 (in the example of FIG. 6, "192.168.0.10"→"192.168.10.10").

Changing the IP address of the setting tool 7 so that the setting tool 7 belongs to the same subnet as the network devices 2 and 3 allows the setting tool 7 to access each of the network devices 2 and 3.

FIG. 7 illustrates how connection setting information is set for each of the backbone routers 4-6. To set connection setting information for each of the backbone routers 4-6, the IP address of the setting tool 7 is changed so that the setting tool 7 belongs to the same subnet as the backbone routers 4-6 ("192.168.0.10"→"192.168.100.10"). However, since the address was set for the backbone routers 4-6 at the time of shipment from a factory (in the example of FIG. 7, "192.168.100.1"), a communication cannot be performed normally between the setting tool 7 and each of the backbone routers 4-6.

In the example of FIG. 7, it is conceivable to make a setting over the IP network 1 by directly connecting the setting tool 7 to each of the backbone routers 4-6 or to make settings individually using a serial connection, an infrared communication, or the like.

As another method, unique IP addresses can be assigned to the network devices using a DHCP (dynamic host configuration protocol) for setting IP addresses (connection setting information) for respective network devices automatically.

Patent document 1 discloses a technique relating to a control system of a manufacturing facility which is configured to perform a wireless communication that complies with the wireless LAN standard IEEE 802.11a in the case of a backbone network and to perform a wireless communication that complies with the wireless LAN standard IEEE 802.11b or IEEE 802.11g in the case of a peripheral network.

PRIOR ART DOCUMENT

Patent Document

Patent document 1: JP-A-2007-116424

SUMMARY OF THE INVENTION

Problem to be Solved by the Invention

However, in the example of FIG. 6, the setting tool 7 needs to recognize the IP addresses of the respective network devices 2-6 in advance.

In any of the methods relating to the example of FIG. 7, it is necessary to go to an installation site of each of the backbone routers 4-6 and set connection setting information in front of each device.

In the case of using a DHCP, MAC (media access control) addresses which are pieces of hardware-specific information are used as identifiers. Therefore, if a network device is replaced due to trouble or the like, its MAC address is also changed, which means use of a different IP address. Therefore, the setting tool is also required to change the IP address information when the replacement is made.

Furthermore, to use a DHCP, additional equipment such as a DHCP server is necessary, which incurs increase in introduction cost.

The present invention has been made to solve the above problems, and an object of the present invention is to realize a connection setting information managing system in which connection setting information which allows a network device connected to an IP network to perform a communication over the IP network can be set for the network device without the need for paying attention to the IP address of the network device.

Means for Solving the Problem

An object of the present invention can be achieved with following configurations:

(1) A connection setting information managing system which is configured to set connection setting information using a setting tool, wherein the connection setting information allows a network device connected to an IP network to perform a communication over the IP network, the system comprising:

a connection setting information storage unit configured to store the connection setting information therein, wherein the connection setting information comprises a tag name that is assigned to and is unique to the network device, wherein the setting tool sets the connection setting information to the network device, based on the tag name that is unique to the network device.

(2) The system of clause (1), wherein the IP network serves as a setting virtual network temporarily while the connection setting information is set to the network device.

(3) The system of clause (1) or (2), wherein the setting tool is included in the network device.

(4) The system of any one of clause (1) to (3), wherein the network device comprises a setting requester configured to voluntarily request the setting tool to set the connection setting information.

With the above configurations, connection setting information which allows a network device connected to an IP network to perform a communication over the IP network can be set for the network device without the need for paying attention to the IP address of the network device.

MODES FOR CARRYING OUT THE INVENTION

Figure 1:
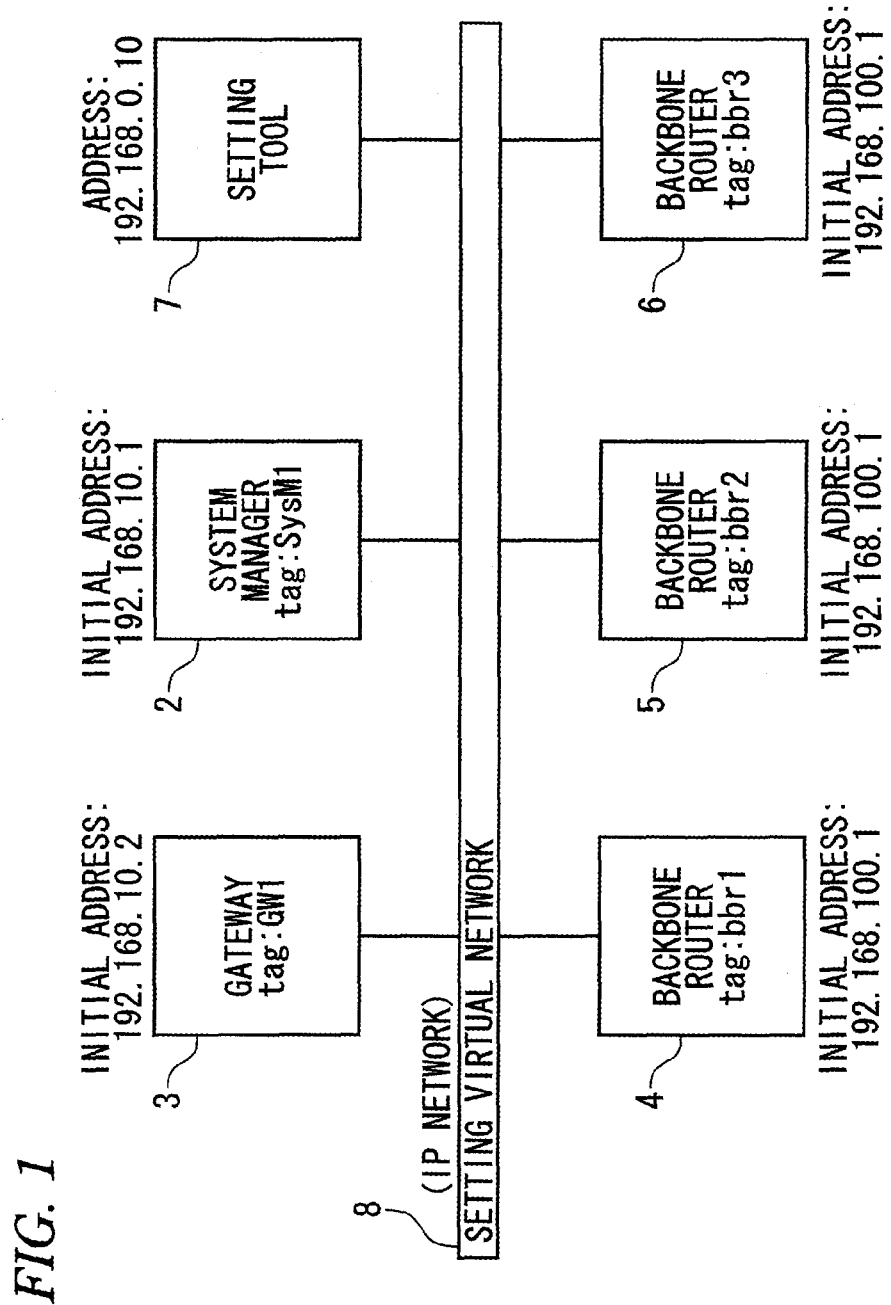
FIG. 1 is a block diagram showing an embodiment of the present invention.
Figure 5:
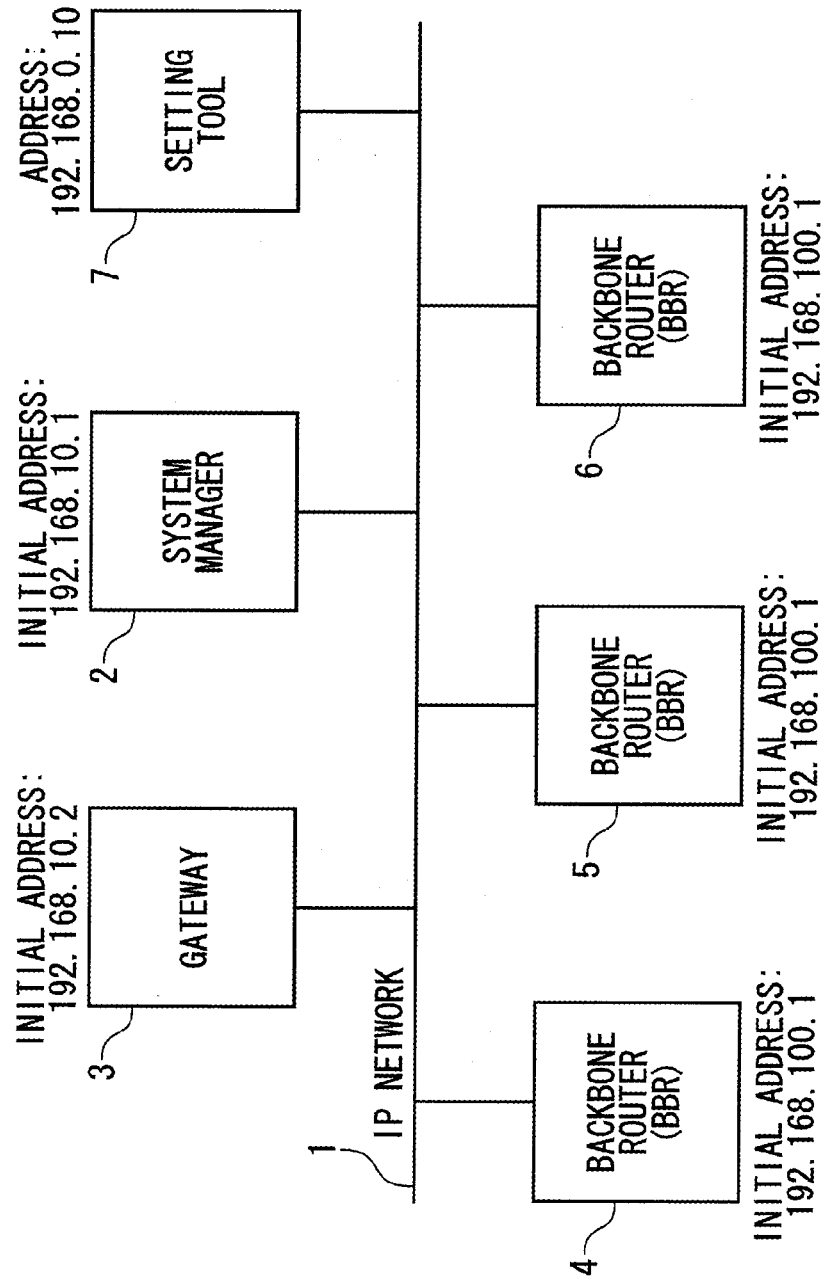
FIG. 5 is a block diagram showing an example network which is part of a conventional connection setting information managing system.
Figure 6:
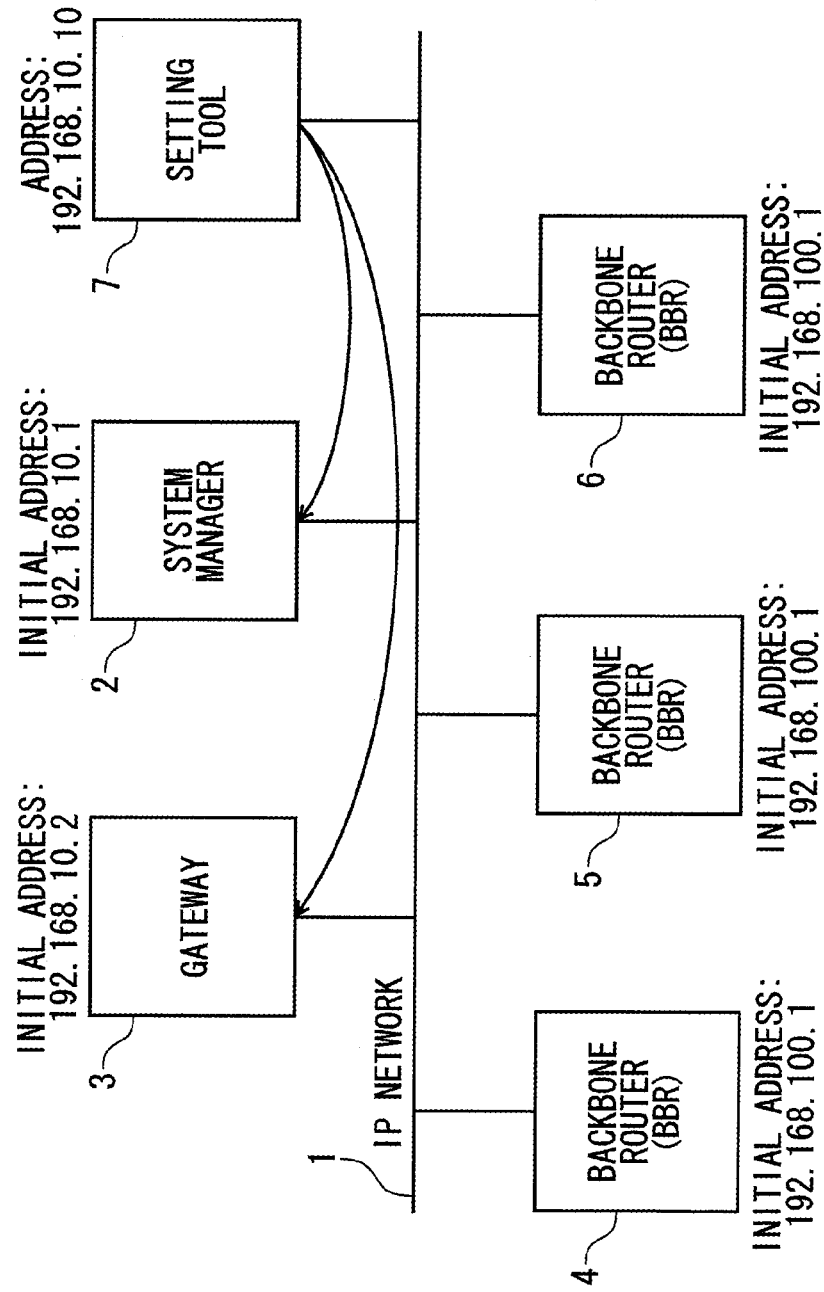
FIG. 6 illustrates how connection setting information is set for each of a system manager 2 and a gateway 3 shown in FIG. 5.
Figure 7:
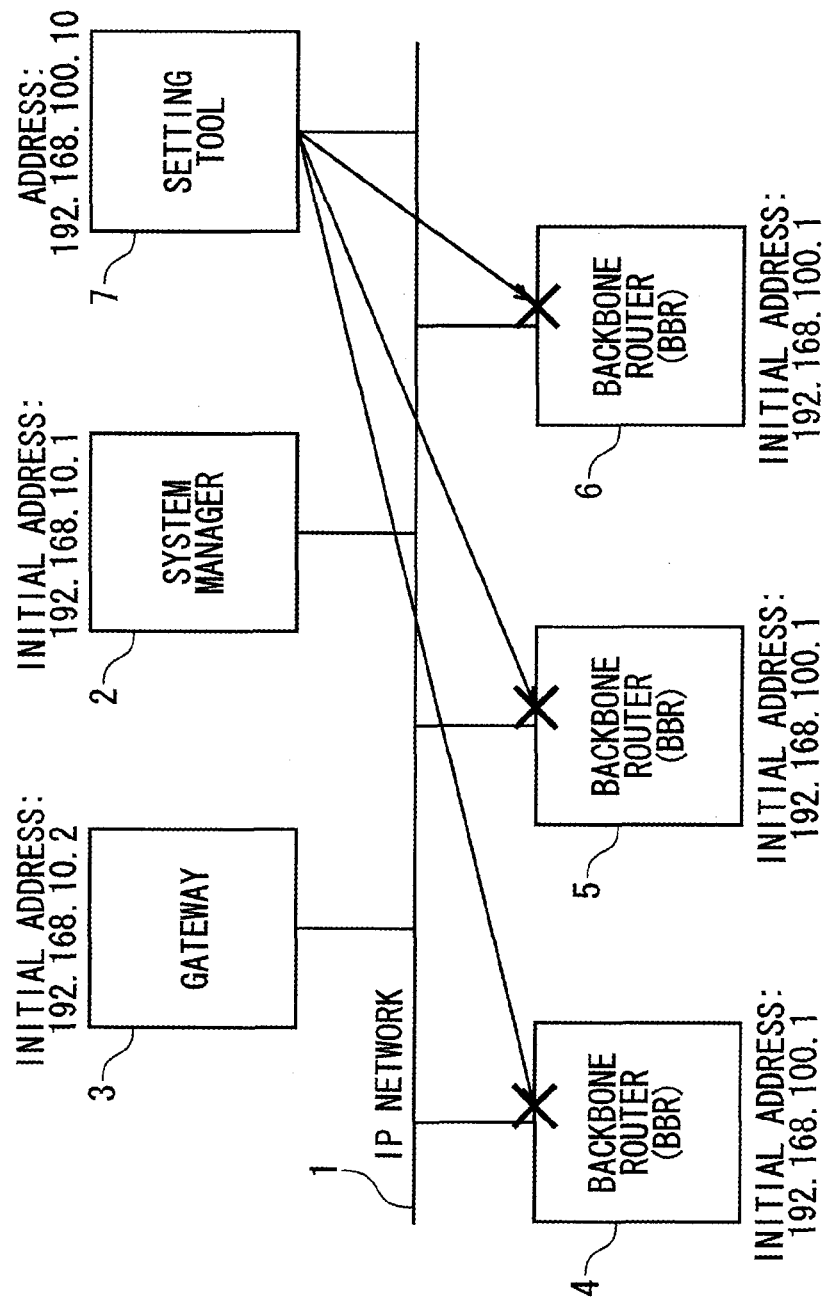
FIG. 7 illustrates how connection setting information is set for each of backbone routers 4-6 shown in FIG. 5.

An embodiment of the present invention will be hereinafter described in detail. FIG. 1 is a block diagram showing an embodiment of the invention, in which items having the same ones in FIG. 5 are given the same reference numerals as the latter. The difference between FIGS. 1 and 5 is that the network devices shown in FIG. 1 are assigned respective unique tag names.

More specifically, as shown in FIG. 1, the system manager 2 is assigned a tag name "tag: SysM1," the gateway is assigned a tag name "tag: GW1," the backbone router 4 is assigned a tag name "tag: bbr1," the backbone router 5 is assigned a tag name "tag: bbr2," and backbone router 6 is assigned a tag name "tag: bbr3." When the setting tool 7 sets connection setting information for each of the network devices 2-6, the IP network 1 serves as a setting virtual network 8 temporarily.

Figure 2:
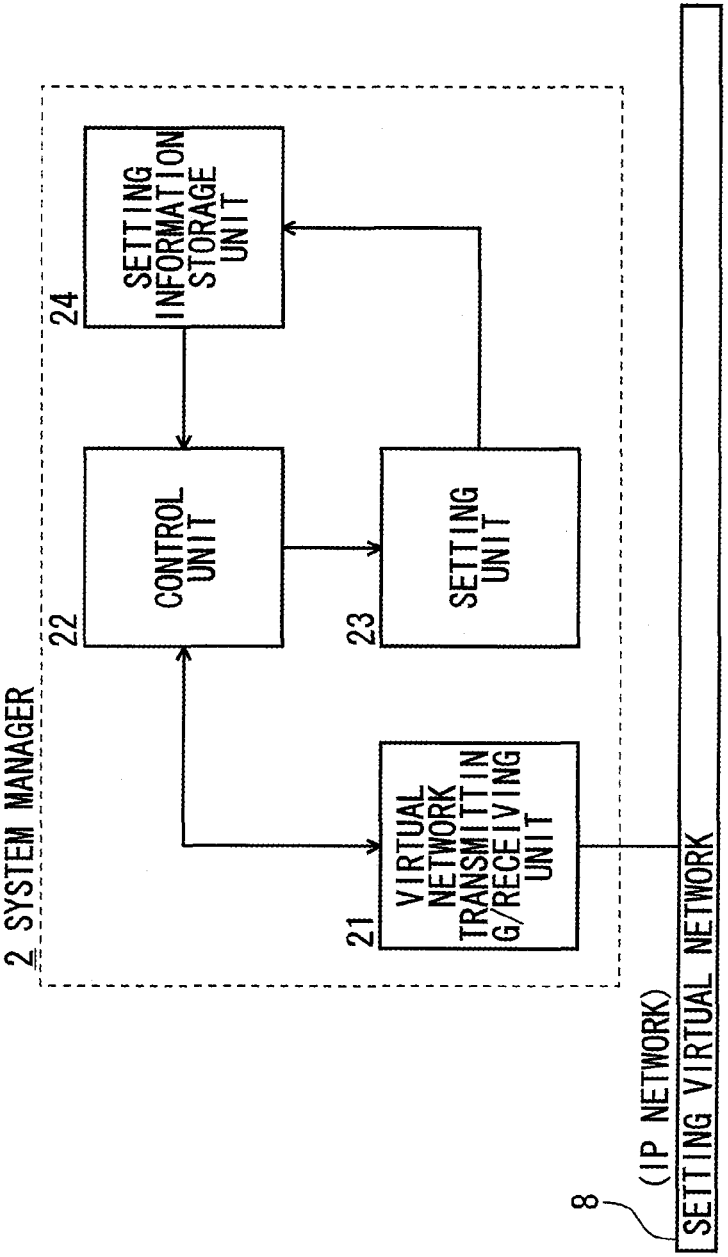
FIG. 2 is a block diagram showing a specific example of a network device used in the embodiment.

FIG. 2 is a block diagram showing a specific example of a network device (system manager 2) used in the embodiment. The system manager 2 is equipped with a virtual network transmitting/receiving unit 21, a control unit 22, a setting unit 23, and a connection setting information storage unit 24.

The virtual network transmitting/receiving unit 21 exchanges messages with the setting tool 7 over the setting virtual network 8. The control unit 22 generates a message indicating a content of processing according to a message received by the virtual network transmitting/receiving unit 21 and passes it to the control unit 23. The control unit 22 also generates a message for requesting the setting tool 7 to make setting processing and outputs it.

The setting unit 23 performs, according to a message received from the setting tool 7, processing for changing the self setting and processing for storing received connection setting information in the connection setting information storage unit 24. The connection setting information storage unit 24 stores the self tag name, a setting specified by the setting tool 7, and other information.

The other network devices 3-6 are equipped with virtual network transmitting/receiving units 31-61, control units 32-62, setting units 33-63, and connection setting information storage units 34-64, respectively, in the same manner as shown in FIG. 2, but they are not shown in any drawings.

Figure 3:
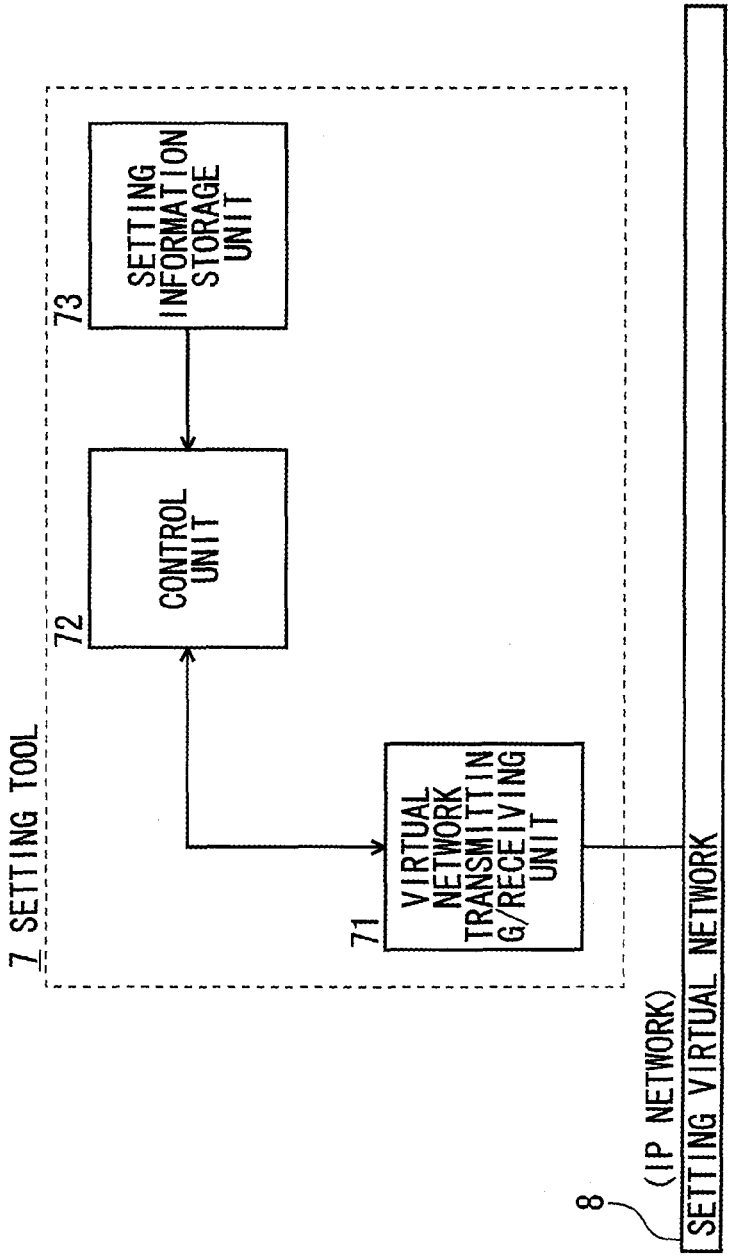
FIG. 3 is a block diagram showing a specific example of a setting tool 7 used in the invention.

FIG. 3 is a block diagram showing a specific example of the setting tool 7 used in the invention. The setting tool 7 is equipped with a virtual network transmitting/receiving unit 71, a control unit 72, and a connection setting information storage unit 73.

The virtual network transmitting/receiving unit 71 exchanges messages with each of the network devices 2-6 over the setting virtual network 8. The control unit 72 makes searches relating to the network devices 2-6 which are connected to the setting virtual network 8, and makes connection settings for the network devices 2-6. The connection setting information storage unit 73 stores connection setting information thus set for each of the network devices 2-6.

Figure 4:
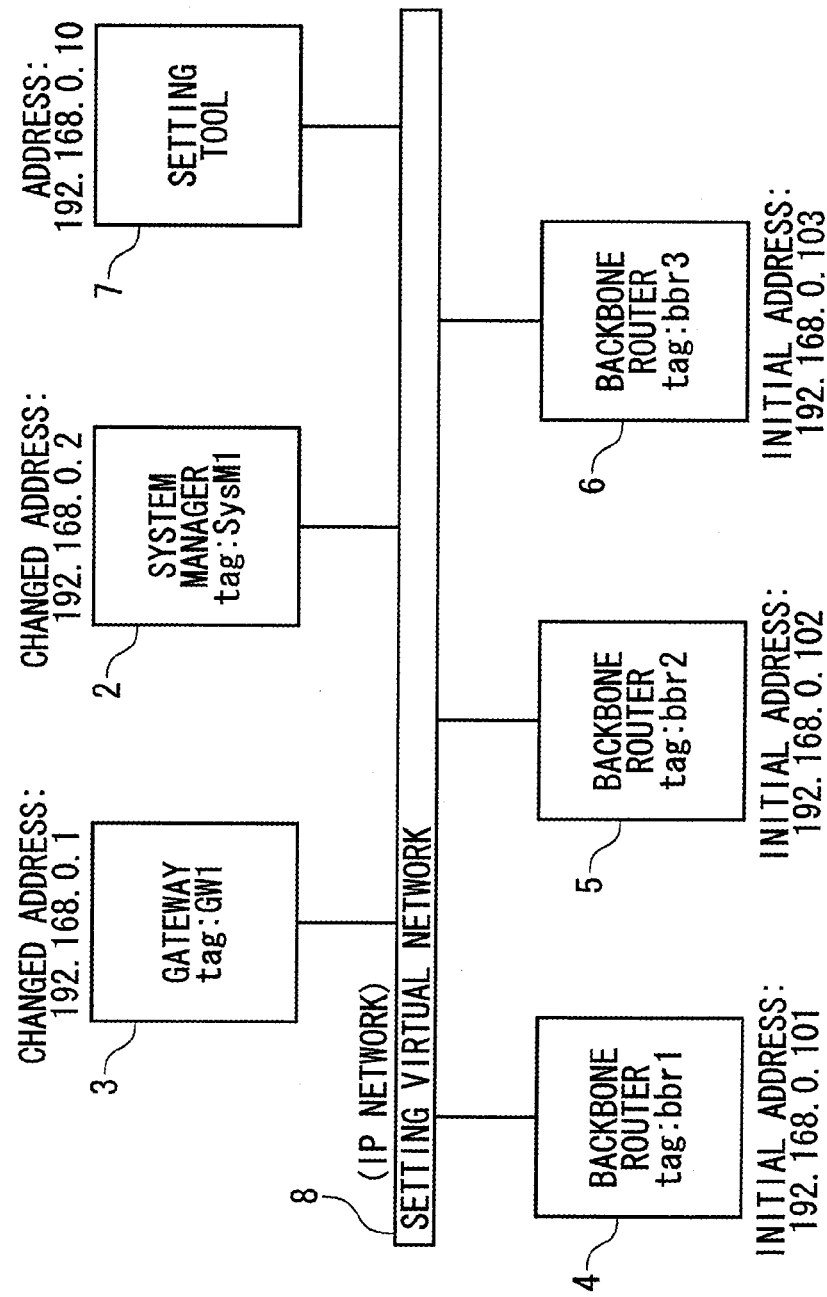
FIG. 4 shows an example network configuration after changing of connection setting information.

FIG. 4 shows an example network configuration after the connection setting information has been changed with the above-described configuration. Items having the same ones in FIG. 1 are given the same reference numerals as the latter. As shown in FIG. 4, with regard to the IP addresses of the respective network devices 2-6, for the system manager a change has been made from the initial address "192.168.10.1" to "192.168.0.2," for the gateway 3 a change has been made from the initial address "192.168.10.2" to "192.168.0.1," for the backbone router 4 a change has been made from the initial address "192.168.100.1" to "192.168.0.101," for the backbone router 5 a change has been made from the initial address "192.168.100.1" to "192.168.0.102," and for the backbone router 6 a change has been made from the initial address "192.168.100.1" to "192.168.0.103."

As described above, the setting virtual network 8 is constructed on the IP network 1 to which the network devices 2-6 are connected. The setting virtual network 8 performs a mutual communication using multicast.

Settings are made in advance so that the network devices 2-6 and the setting tool 7 share a multicast address (e.g., "239.123.123.123") to be used for connection to the setting virtual network 8 and receive packets directed to the multicast address. In the setting virtual network 8, "239.123.123.123" is always used as the destination address of a message.

With the above configuration, each of the network devices 2-6 which share the multicast address can receive a message.

Each of messages that are exchanged in the setting virtual network 8 contains a destination tag name and a message type. With this measure, each of the network devices 2-6 which has received a message from the setting virtual network 8 can determine whether not the received message is a message that should be processed by comparing the destination tag name with its own tag name. If the destination tag name coincides with its own tag name, the network device performs prescribed processing according to the message type.

Since each of the network devices 2-6 performs a communication over the setting virtual network 8, the setting tool 7 can communicate with each of the network devices 2-6 (subjects of setting) without knowing its IP address in advance.

That is, the use of a multicast address allows a device to send and receive a message even if its IP address which was set at the time of shipment from a factory is the same as the IP address of another device.

In the case of the network devices 2-6 to be connected to an industrial network, they are shipped from a factory in a state that they are assigned tags that are unique to the respective network devices 2-6 in the network. The setting tool 7 sets connection setting information for the respective network devices 2-6 on the basis of the tags which have been set for the respective network devices 2-6 and are unique to the respective network devices 2-6, rather than their IP addresses (conventional case).

A description will be made of an operation according to the invention having the above configuration.

The setting tool 7 sends messages that inquire tag information from the network devices 2-6 which are connected to the setting virtual network 8. These messages are generated by the control unit 72 of the setting tool 7 and sent to the setting virtual network 8 through the virtual network transmitting/receiving unit 71.

In the network devices 2-6, their own virtual network transmitting/receiving unit 21-61 receive the messages and pass the received messages to the control units 22-62, respectively. The control units 22-62 refer to the self tag names stored in the connection setting information storage units 24-64, respectively, and generate messages for notification of those tag names. These messages are sent to the setting virtual network 8 through the respective virtual network transmitting/receiving units 21-61.

In the setting tool 7, such a message is received by its own virtual network transmitting/receiving unit 71 and passed to the control unit 72. The control unit 72 searches the connection setting information storage unit 73 for connection setting information such as an IP address corresponding to the tag name contained in the received message on the basis of the tag name. If corresponding connection setting information exists, the control unit 72 generates a setting message. The setting message is sent to the setting virtual network 8 through the virtual network transmitting/receiving unit 71.

Each of the network devices 2-6 receives such a setting message through its own one of the virtual network transmitting/receiving units 21-61 and passes it to its own one of the control units 22-62. Although the setting information reaches all the network devices 2-6 connected to the setting virtual network 8, each of the control units 22-62 checks the tag name contained in the setting message and passes the setting message to the associated one of the setting units 23-63 if the tag name contained in the setting message coincides with the self tag name. The associated one of the setting units 23-63 causes the connection setting information transmitted from the setting tool 7 to be reflected in the self setting. If the tag name contained in the setting message does not coincide with the self tag name, the associated one of the setting units 23-63 discards the received connection setting information.

With the above operation, the setting tool 7 can set proper connection setting information for each of the network devices 2-6. After being set in the above-described manner, each of the network devices 2-6 can perform a communication without using the setting virtual network 8 because a correct IP address is set therein.

Alternatively, the network devices 2-6 can be set automatically by sending setting request messages voluntarily when, for example, they are booted. A flow of this operation will be described below.

The control units 22-62 of the network devices 2-6 take out their own tag names from the connection setting information storage unit 24-64 and generate setting request messages, respectively. The generated setting request messages are sent to the setting virtual network 8 through the respective virtual network transmitting/receiving units 21-61.

In the setting tool 7, such a setting request message is received by the virtual network transmitting/receiving unit 71 and passed to the control unit 72. The control unit 72 searches the connection setting information storage unit 73 for connection setting information such as an IP address corresponding to the tag name contained in the received setting request message on the basis of the tag name. If corresponding connection setting information exists, the control unit 72 generates a setting message. The setting message is sent to the setting virtual network 8 through the virtual network transmitting/receiving unit 71.

In each of the network devices 2-6, such a setting message is received by its own one of the virtual network transmitting/receiving units 21-61 and passed to its own one of the control units 22-62. Its own one of the control units 22-62 checks the tag name contained in the setting message and passes the setting message to the associated one of the setting units 23-63 if the tag name contained in the setting message coincides with the self tag name. The associated one of the setting units 23-63 causes the connection setting information transmitted from the setting tool 7 to be reflected in the self setting.

Since the network devices 2-6 are discriminated from each other using their respective tag names, connection setting information can be set without paying attention to IP addresses assigned to the respective network devices 2-6.

Connection setting information can be set for the respective network devices 2-6 even if the setting tool 7 and the network devices 2-6 have different IP addresses.

Even if the same initial IP address is set for the plural network devices, connection setting information can be set for the respective network devices 2-6 because they are discriminated from each other on the basis of their tag names.

Furthermore, connection setting information can be set automatically by constructing a system so that the network devices 2-6 send setting request messages voluntarily when, for example, they are booted.

Although the above embodiment is directed to the case of using IPv4 in constructing an IP network, a similar configuration can be applied to a case of using IPv6.

Although the above embodiment is directed to the case that the setting tool 7 is connected to the same network 1 as the network devices 2-6, connection setting information can be set for other network devices that are connected to a different subnet than the setting tool is by using a multicast-compatible router.

Where a setting tool is included in a network device, it becomes possible to complete setting of all network devices merely by connecting the network device to an IP network.

The above description is directed to the particular, preferred embodiment for the purpose of description and illustration of the invention. Therefore, the invention is not limited to the above embodiment and includes even more changes and modifications without departing from the essence of the invention.

As described above, the invention makes it possible to realize a connection setting information managing system in which connection setting information which allows a network device connected to an IP network to perform a communication over the IP network can be set for the network device without the need for paying attention to the IP address of the network device.

The present application is based on Japanese Patent Application No. 2011-071917 filed on Mar. 29, 2011, the disclosure of which is incorporated herein by reference.

EXPLANATIONS OF LETTERS AND NUMERALS

1: IP Network
2: System Manager
  21: Virtual network transmitting/receiving unit
  22: Control unit
  23: Setting unit
  24: Connection setting information storage unit
3: Gateway
  31: Virtual network transmitting/receiving unit
  32: Control unit
  33: Setting unit
  34: Connection setting information storage unit
4-6: Backbone Routers
  41-61: Virtual network transmitting/receiving units
  42-62: Control units
  43-63: Setting units
  44-64: Connection setting information storage units
7: Setting Tool
  71: Virtual network transmitting/receiving unit
  72: Control unit
  73: Connection setting information storage unit
8: Setting Virtual Network

The invention claimed is:

1. A connection setting information managing system which is configured to set connection setting information, the system comprising:
  a setting tool;
  a connection setting information storage unit; and
  a plurality of network devices,
  wherein the connection setting information allows each of the plurality of network devices connected to an IP network to perform a communication over the IP network,
  wherein the connection setting information storage unit is configured to store the connection setting information and a tag name that is assigned to and is unique to each network device,
  wherein the setting tool is configured to:
    multicast a message requesting the tag name to the IP network serving as a setting virtual network temporarily while the connection setting information is set to the network device and receive the tag name multicast from the network device over the IP network serving as the setting virtual network,
    in response to receiving the tag name from the network device, search the connection setting information storage unit for an IP address assignment in the connection setting information corresponding to the received tag name, and
    multicast the tag name, a message type, and the connection setting information to the IP network serving as the setting virtual network for receipt by the network device, the network device performing prescribed processing according to the message type to set the connection setting information to the network device, based on the tag name that is unique to the network device.

2. The system of claim 1, wherein
each of the network device and the setting tool shares, in advance, a multicast address to be used for connection to the setting virtual network and receives a packet that is directed to the multicast address.

3. The system of claim 2, wherein
the setting tool is configured to perform a communication using the setting virtual network until a correct IP address corresponding to the tag name of the network device is set to the network device, and
the setting tool performs a communication without using the setting virtual network after the correct IP address is set to the network device.

4. The system of claim 1, wherein the setting tool is included in the network device.

5. The system of claim 1, wherein the network device comprises a setting requester configured to voluntarily request the setting tool to set the connection setting information.

6. The system of claim 1, wherein the tag name comprises a unique identification of a specific type of the network device.

7. The system of claim 1,
wherein, when the network device is booted, the network device automatically sends the tag name to the setting tool, and
wherein, after receiving the IP address assignment, the network devices can perform a communication based on the IP address assignment without the setting virtual network.

\* \* \* \* \*